Nov. 18, 1969   E. L. POTTS   3,479,067
FLEXIBLE COUPLING
Filed May 6, 1968   2 Sheets-Sheet 2

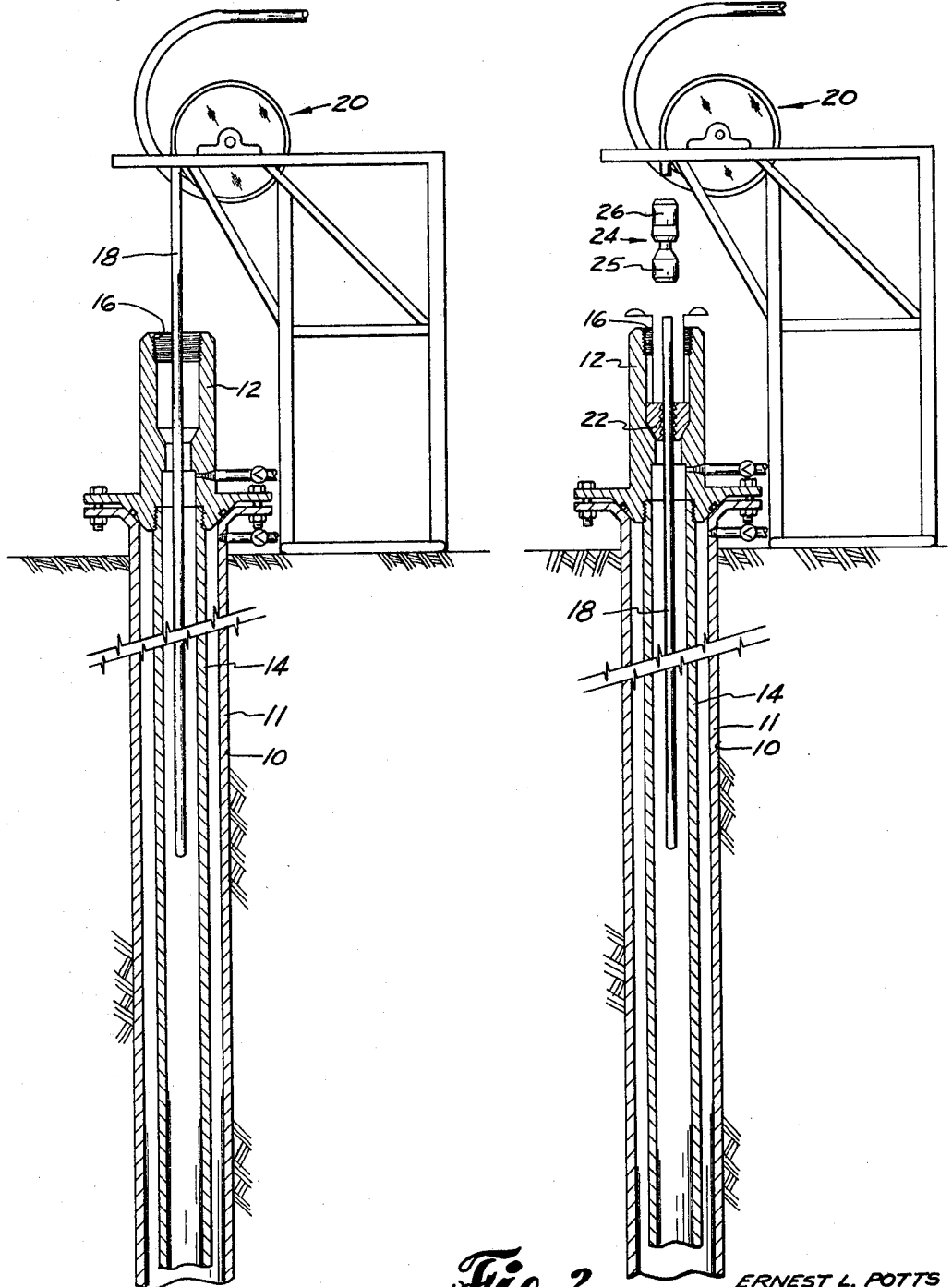

ERNEST L. POTTS
INVENTOR.

BY

ATTORNEY

── # United States Patent Office 3,479,067
Patented Nov. 18, 1969

3,479,067
FLEXIBLE COUPLING
Ernest L. Potts, Houston, Tex., assignor to
Cicero C. Brown, Houston, Tex.
Filed May 6, 1968, Ser. No. 726,696
Int. Cl. F16l 27/04, 37/00
U.S. Cl. 285—261                                4 Claims

ABSTRACT OF THE DISCLOSURE

A flexible coupling for connecting together lengths of injector tubing which may be wound about a reel. The coupling is formed of a male member and a female member, one being attached to each end of the tubing. The female member has a socket portion receiving a generally ball-shaped pin portion of the male member. A sealing element estatblishes a seal between them. A flexible locking strip is inserted in an aperture of the socket portion and extends around an internal groove therein to secure the coupling together.

---

This invention relates to coupling devices for connecting together tubular bodies, and more particularly to a flexible coupling device for connecting together opposing ends of lengths of injector tubing which is normally stored on a reel.

If after an oil or gas well has been completed, the production of fluid therefrom slacks off, it is common practice to perform testing and remedial operations in an effort to restimulate the well. These operations are commonly known as "work-over" operations. In performing such operations a string of tubing is customarily inserted in the well bore. Although originally the tubing string was formed from lengths of tubing which were threadedly connected together, there is now available continuous lengths of injector tubing. Such tubing may be several thousand feet in length and is stored on a supply reel and fed into the well bore by a power reel such as disclosed in U.S. Patent No. 3,116,781 issued Jan. 7, 1964, and entitled "Apparatus for Completion and Working Over of Wells." For example, such tubing may be used as a carrier for gas lift valves as disclosed in U.S. Patent 3,373,816 issued Mar. 19, 1968 and entitled "Method for Injector Tubing Gas Lift."

After the injector tubing has been lowered to the proper depth in the well, it is usually severed so that the work-over apparatus may be attached to the tubing in the well. After the work-over operation has been completed the length of tubing which was severed is reconnected to the remainder of the tubing and the injector tubing spooled back on the supply reel. It has been found that if conventional rigid couplings are used to reconnect the length of severed tubing, the coupling often breaks as the coupling runs over the reel.

Accordingly, it is an object of the present invention to provide a coupling for connecting together opposing ends of injector tubing which coupling will have sufficient flexibility to permit the injector tubing to be wound about a reel.

This and other objects will be accomplished by attaching to one opposing end of the injector tubing a male member and to the other opposing end a female member. The female member has a socket portion for receiving a ball shaped pin portion of the male member. Means establish a seal between the members. The socket portion has an internal groove and an aperture communicating with the groove. A flexible locking member is inserted in the aperture and extends around the internal groove to secure the male and female members together.

Other and more specific objects and advantages of this invention will become more readily apparent from the following detailed description when read in conjunction with the accompanying drawing which illustrates one useful embodiment in accordance with this invention.

In the drawing:

FIG. 1 is a cross-sectional view of a well bore having injector tubing inserted therein;

FIG. 2 is a view similar to FIG. 1 illustrating the injector tubing having been severed so as to require a coupling before it can be reeled back out of the well bore;

Figure 3:
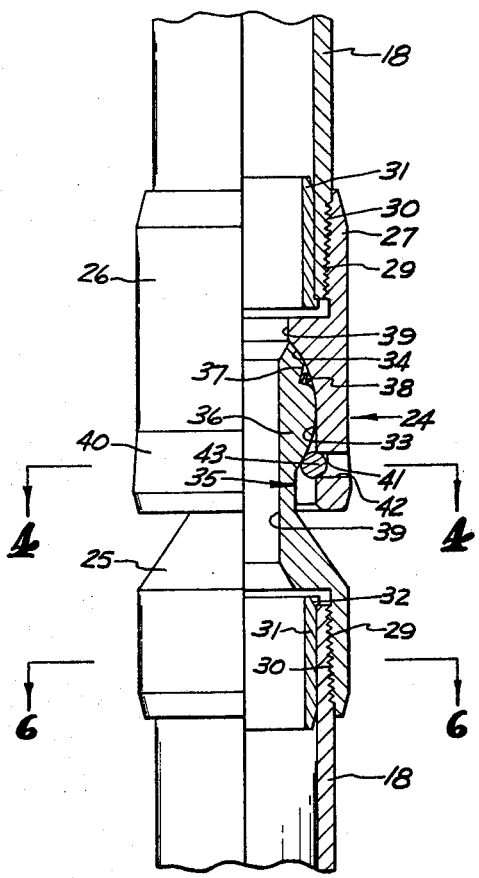
FIG. 3 is a vertical cross-sectional view of a flexible coupling constructed in accordance with the present invention.

Turning now to FIG. 1, a vertical well bore 10 is provided with casing 11 on which is mounted a well head 12. Depending from the well head is a string of production tubing 14 through which the well is usually produced. Access to the production tubing may be had through an opening 16 in the top of well head 12. As can be seen, a continuous string of injector tubing 18 is being fed into the well bore from a supply reel (not shown) by a power reel 20 which may be similiar to the apparatus disclosed in aforesaid U.S. Patent No. 3,116,781.

When the injector tubing has reached the proper depth in the well bore a slip device 22 (see FIG. 2) is activated to secure the injector tubing in the well bore. In order to gain access to the well bore, the injector tubing is severed. The end of the tubing is then connected to the apparatus being used in the work-over operation. After the work-over operation has been completed, the injector tubing is withdrawn from the well bore and rolled back up on the supply reel. Before this can be accomplished it is necessary to reconnect the severed length of injector tubing. To do so flexible coupling 24 of the present invention may be utilized.

The flexible coupling 24 is formed of a male member 25 and a female member 26. Each member has a tubular shaped portion 27, the interior surface of which is provided with female pipe threads 29 for attachment with male pipe threads 30 which are formed on the severed ends of the injector tubing. In as much as the injector tubing may be thin walled, a sleeve 31 having an external shoulder 32 may be placed in the end of the injector tubing to provide internal support so that the threaded joint, made up by threads 29–30, may be made up tight. Accordingly, male member 25 is attached to one end and female member 26 is attached to the opposing end of the injector tubing.

To complete the coupling and at the same time provide flexibility so that the coupling will be sufficiently flexible so that the injector tubing can be wound about a reel, the coupling is provided with a ball and socket connection. Female member 26 is provided with a cup shaped portion 33 forward of the tubular portion 27. The inner end of cup shaped portion 33 is formed into a generally hemispherical socket 34. Male member 25 has a pin portion 35 forward of tubular portion 27. The front end of pin 35 is formed into a generally ball shaped portion 36. The front end of the ball shaped portion mates with socket 34.

Adjacent the front end of ball shaped portion 36 there is a circumferential groove 37 in which there is positioned a sealing element 38, which may be an O-ring. In the assembled condition, the sealing element will form a seal between the ball and socket portions. Accordingly, any flow through the coupling will be contained in the central longitudinal flow passage which is formed of passages 39 in the coupling members.

Figure 4:
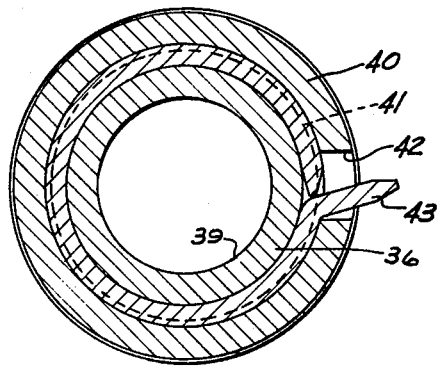
FIG. 4 is a sectional view taken generally along line 4—4 of FIG. 3.
Figure 5:
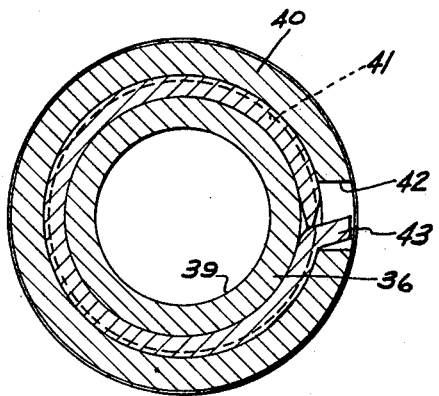
FIG. 5 is a view similar to FIG. 4 after the flexible locking member has been severed.
Figure 6:
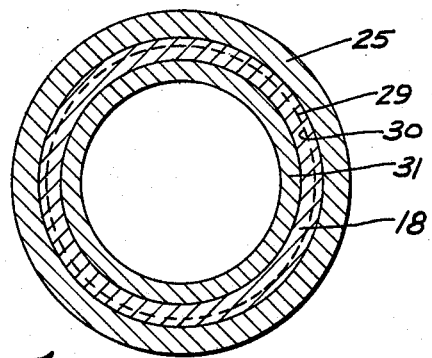
FIG. 6 is a sectional view taken generally along lines 6—6 of FIG. 3.

To retain the coupling in assembled condition, the cup shaped portion of female member 26 is provided with an enlarged outer end 40 having an internal circumferential groove 41 located outwardly of the area which is contacted by the girth of the ball shaped portion. The rear portion of the ball shaped portion opposes internal groove 41. An aperture 42 extends from the exterior wall of outer end 40 into internal groove 41. A locking member 43 which may be formed of a strip of flexible material is inserted in aperture 42 and driven around internal groove 41 between the outer wall of the internal groove and the opposing wall of the ball shaped portion (see FIG. 4). When the front end of the locking member has fully traversed the internal groove, the locking member may be bent about the edge of aperture 42 and cut off to provide outer end 40 with a smooth exterior peripheral surface (see FIG. 5). The locking member 43 will retain the front end of the ball shaped portion in contact with the socket portion of cup shaped portion 33 so that the sealing element will form an effective seal therebetween. Such seal may either be a compression seal, or if an O-ring is used, a pressure acting seal. Since the front end of the pin portion is ball shaped there will be a limited amount of flexibility to the coupling allowing the coupling to flex when the injector tubing is wound around a reel. It has been found that if coupling 24 is used to connect together severed ends of injector tubing that the reconnected tubing may be wound over power and supply reels without coupling breakage.

As can be seen from the foregoing, a flexible coupling is provided which is easy to manufacture and install and has sufficient flexibility to permit the injector tubing to be wound about power and supply reels.

It will be understood that various changes and modifications may be made in the details of the illustrative embodiment without departing from the spirit of this invention.

What I claim and desire to secure by Letters Patent is:

1. Coupling apparatus for connecting together opposing ends of two lengths of injector tubing, which tubing may be wound about a reel, said coupling comprising: a male member attached to one opposing end of the tubing and a female member attached to the other opposing end of the tubing, the male member having a pin portion the front end of which is formed into a generally ball shaped portion, the female member having a cup-shaped portion the inner end of which is formed into a generally hemispherical portion to mate with the front end of the ball shaped portion, the male member and the female member each having a passage which are aligned to form a passage through the coupling, means forming a seal between the front end of the ball shaped portion and the inner end of the cup shaped portion, and locking means outward of the seal means retaining the pin portion in the cup shaped position, said locking means including: an internal circumferential groove in the cup shaped portion outward of the area contacted by the girth of the ball shaped portion, the rear of the ball shaped portion opposing said internal groove, an aperture extending from the internal groove to the exterior surface thereof, and a locking member formed of a strip of flexible material threaded through the aperture and about the internal groove to secure the male and female members together.

2. The coupling specified in claim 1 wherein the front end of the ball shaped portion has a circumferential groove opposing the inner end of the cup shaped portion and a sealing element is positioned in said groove to form the seal means between the ball shaped portion and inner end of the cup shaped portion.

3. The coupling specified in claim 1 wherein the male member and the female member are provided with internal thread means for threadedly attaching each member to a threaded end of the tubing.

4. Flexible coupling apparatus for connecting together opposing ends of tubular members comprising: a male member attached to one opposing end of the tubular members and a female member attached to the other opposing end, the male member having a pin portion the front end of which is formed into a generally ball shaped portion, the female member having a cup shaped portion the inner end of which is formed into a generally hemispherical portion to mate with the front end of the ball shaped portion, the male and female members each having a central passage which are aligned to form a longitudinal passage through the coupling, the ball shaped portion having a circumferential groove adjacent its front end, a sealing element in said groove cooperating with the inner end of the cup shaped portion to form a seal therebetween, the cup shaped portion having an internal circumferential groove outward of the area contacted by the girth of the ball shaped portion, the rear of the ball shaped portion opposing said internal groove, and an aperture extending from the internal groove to the exterior surface of the cup shaped portion, and a locking member formed of a strip of flexible material threaded through the aperture and about the internal groove to secure the male and female members together.

References Cited

UNITED STATES PATENTS

| | | | |
|---|---|---|---|
| 386,547 | 7/1888 | Martin | 285—262 |
| 1,940,870 | 12/1933 | Litton | 285—397 X |
| 2,460,741 | 2/1949 | Friedman | 285—397 X |
| 2,013,660 | 9/1935 | Lauer | 285—305 |

FOREIGN PATENTS

| | | |
|---|---|---|
| 131,163 | 1/1949 | Australia. |

DAVID J. WILLIAMOWSKY, Primary Examiner

W. L. SHEDD, Assistant Examiner

U.S. Cl. X.R.

285—305